United States Patent [19]
Meyer, Jr.

[11] Patent Number: 5,811,973
[45] Date of Patent: Sep. 22, 1998

[54] DETERMINATION OF DIELECTRIC PROPERTIES WITH PROPAGATION RESISTIVITY TOOLS USING BOTH REAL AND IMAGINARY COMPONENTS OF MEASUREMENTS

[75] Inventor: Wallace Harold Meyer, Jr., Houston, Tex.

[73] Assignee: Baker Hughes Incorporated, Houston, Tex.

[21] Appl. No.: 671,913

[22] Filed: Jun. 28, 1996

Related U.S. Application Data

[63] Continuation of Ser. No. 212,102, Mar. 11, 1994, abandoned.

[51] Int. Cl.$^6$ .............................. G01V 3/10; G01V 3/18
[52] U.S. Cl. ........................ 324/338; 324/339; 324/341
[58] Field of Search ................................. 324/323, 324, 324/332, 333–341, 344, 345, 346, 3

[56] References Cited

U.S. PATENT DOCUMENTS

| | | | |
|---|---|---|---|
| 3,891,916 | 6/1975 | Meador | 324/6 |
| 4,216,536 | 8/1980 | More | 367/83 |
| 4,308,499 | 12/1981 | Thierbach et al. | 324/338 |
| 4,703,277 | 10/1987 | Kenyon et al. | 324/323 |
| 4,720,681 | 1/1988 | Sinclair et al. | 324/339 |
| 4,730,161 | 3/1988 | Cox et al. | 324/341 |
| 4,780,679 | 10/1988 | Kenyon et al. | 324/341 |
| 4,786,873 | 11/1988 | Sherman | 324/323 |
| 4,873,488 | 10/1989 | Barber et al. | 324/339 |
| 4,899,112 | 2/1990 | Clark et al. | 324/338 |
| 4,968,940 | 11/1990 | Clark et al. | 324/338 |
| 5,065,099 | 11/1991 | Sinclair et al. | 324/339 |
| 5,081,419 | 1/1992 | Meador et al. | 324/338 |
| 5,089,989 | 2/1992 | Schmidt et al. | 367/35 |
| 5,144,245 | 9/1992 | Wisler | 324/338 |
| 5,157,331 | 10/1992 | Smith | 324/338 |
| 5,157,605 | 10/1992 | Chandler et al. | 324/339 |
| 5,187,661 | 2/1993 | Sinclair | 324/339 |
| 5,210,495 | 5/1993 | Hapashy et al. | 324/338 |
| 5,278,507 | 1/1994 | Bartel et al. | 324/338 |
| 5,345,179 | 9/1994 | Habashy et al. | 324/338 |
| 5,367,262 | 11/1994 | Manning | 324/341 |
| 5,402,068 | 3/1995 | Meador et al. | 324/338 |

FOREIGN PATENT DOCUMENTS 8401439  4/1984  WIPO .

OTHER PUBLICATIONS

"Inversion of 2 MHz Propagation Resistivity Logs," W.H. Meyer, *SPWLA 33d Annual Logging Symposium*, Jun. 14–17, 1992.

"Measurement of Dielectric Response of Water Saturated Rocks", Taherian, Kenyon & Safinya, *55 Geophysics 12* (Dec. 1990) pp. 1530–1541, 6 Figs, 2 Tables.

"Effects of Arbitrarily Shaped Boreholes and Invasion on Propagation Resistivity Measurements in Drilling Horizontal Wells" Jian Qun Wu et al. *Progress in Electromagnetic Research Symposium*, Pasadena, California, Jul. 14, 1993.

"Effects of Eccentering MWD Tools in Electromagnetic Resistivity Measurements," Jian Qun Wu et al., *SPWLA 31st Annual Logging Symposium*, Jun. 24–27, 1990.

"Measurement of Dielectric Response of Water Saturated Rocks", Taherian, Kenyon & Safinya; Geophysics, vol. 55, No. 12 (Dec. 1990) pp. 1530–1541.

*Primary Examiner*—Sandra L. O'Shea
*Assistant Examiner*—Mack Haynes
*Attorney, Agent, or Firm*—Madan & Morris, PLLC

[57] ABSTRACT

A propagation resistivity measurement-while-drilling system is used to determine the resistivity (or conductivity) of the conate formation fluid, the dielectric constant of the dry rock matrix, and the water filled porosity of the formation. One or more transmitter-receiver pairs are utilized with the transmitter component of the transmitter-receiver pairs operating at a plurality of frequencies. Water filled porosity measurements can be combined with an independent measurement which responds to the total fluid porosity of the formation to obtain a measure of formation hydrocarbon saturation in fresh or saline conate water environments.

22 Claims, 6 Drawing Sheets

DETERMINATION OF DIELECTRIC PROPERTIES WITH PROPAGATION RESISTIVITY TOOLS USING BOTH REAL AND IMAGINARY COMPONENTS OF MEASUREMENTS

This is a continuation of application Ser. No. 08/212,102 filed on Mar. 11, 1994, now abandoned.

BACKGROUND OF THE INVENTION

This invention relates to the measurement of geophysical parameters of earth formations penetrated by a borehole and more particularly to propagation resistivity measurements at multiple frequencies and at multiple transmitter-receiver spacings. Measurements are made by using one or more transmitters which induce an alternating voltage into the borehole and the earth formation penetrated by the borehole and by using one or more longitudinally spaced receivers to detect the amplitude and phase of electromagnetic radiation induced within the borehole and earth formation. The measured responses are affected by properties of the earth formation including electrical conductivity, magnetic permeability, dielectric permeability and the pore volume or porosity of the rock matrix. In addition, the borehole environs also affect the measurements. This invention sets forth means and methods for determining the conductivity of formation water, the dielectric constant of the composite of the rock matrix and any oil saturation within the pore space of the rock matrix, and the water filled porosity of the rock matrix. By combining the measurements yielded by the present invention with other borehole devices which measure total effective formation porosity, the oil saturation of the formation can be computed even in formations with fresh waters. The invention is directed toward, but not limited to, measurement-while-drilling (MWD) applications.

Induction techniques have been used for a number of years to determine the resistivity and other electromagnetic parameters of earth formations penetrated by a borehole. Historically, formation resistivity has been the primary parameter of interest since it is used to delineate hydrocarbons from saline waters. Resistivity measurements can not be used to delineate hydrocarbons from relatively fresh waters due to a lack of contrast in the resistivities of the two fluids. Conceptually, an alternating current is applied to a transmitter of a borehole instrument thereby generating a primary electromagnetic field in the earth formation in the vicinity of the transmitter. The primary field interacts with the earth formation thereby setting up a secondary field with the amplitude and phase of this secondary field being related to electromagnetic properties of the formation. Fluids in the borehole and the invasion of these fluids into the formation can adversely affect the measure of electromagnetic properties of the undisturbed or virgin formation. Multiple receivers located at different longitudinal spacings from the transmitter are employed to measure the secondary field and, among other functions, to produce additional measurements which are used to minimize the effects of the borehole and near borehole environs. Although correction for borehole effects is not a major objective of the present invention, the subject will be somewhat pertinent in this disclosure and the concept is hereby introduced as a precursor to discussion which will follow.

REVIEW OF PHYSICAL PRINCIPLES

Phase shift and attenuation measurements in the low megahertz (MHz) frequency range are dependent upon only three electromagnetic properties and the manner in which these three properties are combined and spatially distributed near the borehole transmitter and receiver assembly. The three properties that control, as an example, the propagation of a 2 MHz electromagnetic wave are (1) magnetic permeability, (2) conductivity, and (3) dielectric permittivity. The primary parameter of interest is conductivity (or resistivity) since this is the primary parameter used in hydrocarbon saturation calculations if the connate water is saline. In order to relate the measured phase shift and attenuation measurements made with the borehole instrument to conductivity, assumptions must be made concerning the magnetic permeability and dielectric permittivity of the formation.

Magnetic permeability is defined as the ability of magnetic dipoles in the formation to align themselves with an external field. Minerals and fluids commonly found in sedimentary earth formations do not exhibit significant magnetic permeability. In computing resistivities from measurements of amplitude and phase measurements from a device operating in the mid kilohertz (KHz) to low MHz frequency range, minimal error is introduced in assuming a value of magnetic permeability to be equal to that of free space, or $1.25 \times 10^{-6}$ Henrys/meter.

Conductivity is defined as the ability of a material to conduct an electric charge, while dielectric permittivity is defined as the ability of a material to store an electrical charge. Dielectric permittivity is usually expressed in terms of relative dielectric constant, $\epsilon_r$, which is the dielectric permittivity $\epsilon$ of the substance in question divided by the dielectric permittivity in free space, $\epsilon_o = 8.854 \times 10^{-12}$.

Attention is now turned to dielectric permittivity and the physical principles behind the effects of this parameter upon attenuation and phase signals measured in a borehole environment. In sedimentary formations, dielectric permittivity arises from the ability of electric dipoles to align themselves with an alternating electromagnetic field induced by the borehole instrument. Water molecules will be used for purposes of discussion. There are three phenomena contributing to $\epsilon_r$ in a porous earth formation. The first contribution is the rotation of dipolar water molecules. The water molecule has a slight positive charge on the side to which are bound the two hydrogen atoms, and a corresponding negative charge on the side of the molecule opposite to the bound hydrogen atoms. In the presence of an applied electric field, the water molecule will rotate to align the positive and negative poles of the molecule with the applied electric field. In an alternating (AC) field such as that produced by the borehole instrument, the water molecule will rotate back and forth as the polarity of the applied field alternates. During the time period in which the water molecule is in actual rotation seeking to align with the applied field, the movement of the charge represents electrical charges moving in phase with the applied field and are therefore carrying current and contributing to the composite formation conductivity. Once aligned with the field, the polarized water molecules represent fixed or stored charges and thereby contribute to the formation permittivity until the polarity of the alternating applied field is reversed. At this time, the water molecules again rotate contributing again to composite formation conductivity. This sequence, of course, repeats with the cycling of the applied AC field. Ions dissolved in the formation pore water are a second contributor to $\epsilon_r$ in that they will also be set in motion by the applied AC field and migrate in the direction of the field until they encounter a physical obstruction such as a rock grain forming the boundary of the pore space. Once the ions abut the pore boundary and begin to accumulate, they likewise become fixed or "stored" charges thereby contributing to the formation dielectric permittivity as described by M. A. Sherman, "A Model for the Frequency Dependence of the Dielectric Permittivity of Rock", *The Log Analyst*, Vol. 29, No. 5, September–October, 1988. Cations attached to cation exchange sites on the surface of certain clay minerals are a third contributor to $\epsilon_r$ in that they can also move under the influence of an applied AC field. The movement of cations between various exchange sites produces effects similar to those of free ions in the pore water.

Complicating the issue of dielectric effects is the fact that $\epsilon_r$ values are dependent upon the frequency of the applied field. At low frequencies, dielectric constants can be quite high since the water molecules can easily rotate and align themselves with the field before the polarity of the field reverses. Similarly, dissolved ions can migrate to the boundary of the pore space and accumulate against the pore wall long before the polarity of the field reverses. Likewise, the movement of cations can be completed prior to the reversal of the field polarity. Therefore, at low frequencies, water molecules, dissolved ions and cations spend most of their time in a fixed orientation or position and only a small fraction of the time moving during any given cycle of the applied AC electromagnetic field. At high frequencies, however, the polarity of the applied field will reverse before the three types of mobile charges come to rest. In this situation, the mobile charges spend most of their time moving in phase with the external electromagnetic field thereby increasing the conductivity and resulting in a lower dielectric constant. The phenomena of changing dielectric and conductivity values with frequency is known as dispersion. The frequency at which the rotating molecules or mobile ions can no longer keep pace with the oscillating field is known as the "relaxation frequency". The relaxation frequency, relative dielectric constant $\epsilon_r$, and conductivity $\sigma$ will depend upon various factors such as porosity, mean pore size, the resistivity of the water $R_w$, and shale mineralogy as described in the previously cited reference by Sherman.

J. C. Sims, P. T. Cox and R. S. Simpson, "Complex Dielectric Interpretation of 20 MHz Electromagnetic Logs", Paper SPE 15486, *61 st Annual Technical Conference and Exhibition of the Society of Petroleum Engineers*, Oct. 5–8, 1986, teaches the use of a mixing formula to interpret dielectric log data, but measurements made at only one frequency are employed. U.S. Pat. No. 3,891,916 to R. A. Meador et al teach the use of two frequencies, both much higher than 2 MHz, to determine dielectric constant. Meador et al, however, teach the use of amplitude measurements to determine dielectric constant and resistivity and do not address the problem of dielectric dispersion using two frequencies with both amplitude and phase measurements. U.S. Pat. No. 5,144,245 to M. M. Wisler discloses the use of the Complex Refractive Index Model (CRIM) as a means for correcting resistivity measurements for dielectric effects where the resistivity amplitude and phase data are taken at a single frequency. K. S. Cole and R. H. Cole, "Dispersion and Absorption in Dielectrics", *Journal of Chemical Physics*, Vol. 9. P 341 (1941) disclose a model for dielectric dispersion which can be used as a mixing model in a somewhat similar to the previously referenced CRIM model and could be used as an element in the embodiment of the current invention. There are many other mixing and dispersion models that might also be used.

This brief review of pertinent basic physical principles will assist in fully disclosing the means and methods of the current invention and advances of the current invention over prior art.

SUMMARY OF THE INVENTION

The present invention is directed toward the accurate measure of the conductivity (or resistivity) of earth formation penetrated by a borehole. As discussed previously, formation resistivity combined with formation porosity and connate water resistivity can be used to compute formation hydrocarbon saturation of a porous formation. The invention is further directed toward the determination of the dielectric constant of the formation. This measurement is used to correct resistivity measurements made at certain frequencies for the adverse effects of the dielectric permittivity of the formation. The invention is directed still further toward the determination of the volume fraction of the formation saturated with water. This measurement, when combined with an independent measure such as a neutron porosity measurement which responds to total formation liquid (water plus liquid hydrocarbon), can be used to determine hydrocarbon saturation of the formation in either fresh or saline water environments. Hydrocarbon saturation can not be determined using resistivity measurements only in fresh water environments since the resistivity of fresh water and hydrocarbon exhibits little contrast.

THEORETICAL BASIS

Solutions to Maxwell's equations in homogeneous lossy media are a function of a factor commonly referred to as the propagation constant or wave number, defined herein as "k", which contains conductivity, dielectric constant and magnetic permeability terms. A plane wave solution will have the form $$V = Ce^{ikx} \tag{1}$$

where

V=a field variable;

C=a constant e=the naperian log base i=the square root of $-1$;

x=the distance traveled; and $$k = [\omega^2 \mu_o \mu_r \epsilon_o \epsilon_r) + (i\omega \mu_o \mu_r \sigma)]^{1/2} \tag{2}$$

where:

$\mu_o$=the magnetic permeability of free space;

$\mu_r$=the relative permeability (which is 1.0 for free space and most earth materials);

$\epsilon_o$=the electric permittivity of free space;

$\epsilon_r$=the relative dielectric constant (which is 1.0 in free space);

$\omega$=the angular frequency of the applied field; and $\sigma$=the conductivity which is the inverse of resistivity.

the term k can be rewritten in terms of a relative complex dielectric constant, $\epsilon_r$ which includes the effect of dielectric constant and conductivity, as $$k = k_o \sqrt{\epsilon_r} \sqrt{\mu_r} \tag{3}$$

where $k_0$=the wave number in free space;

$\mu_r$=1; and $\epsilon_r$=[$\epsilon_r$+$i\sigma$(0.1/$\omega\epsilon_o$)]

We now assume a model of the earth formation wherein there are two layers of different propagation constants k and differing complex relative dielectric constants $\epsilon_r$ with the first region spanning $(1-\phi)$ units of length and the second region spanning $\phi$ units of length. A plane wave incident on the layers and passing through the layers without reflection will have the form $$e^{ik_2\phi}e^{ik_1(1-\phi)} = e^{i[k_2\phi+k_1(1-\phi)]} \qquad (4)$$

The effective propagation constant for this model, $k_{eff}$, is therefore $$k_{eff} = k_o \sqrt{\epsilon_{eff}} = = k_o [\sqrt{\epsilon_{c,2}} \; \phi + \sqrt{\epsilon_{c,1}} \; (1-\phi)] \qquad (3)$$

Equation (5) is solved for the equivalent relative dielectric constant to obtain $$\epsilon_{eff} = \epsilon_{c,2}\phi^2 + \epsilon_{c,1}(1-\phi)^2 + 2(1-\phi)\phi \sqrt{\epsilon_{c,1}\epsilon_{c,2}} \qquad (6)$$

Considering all of the above relationships leading to equation (6), it is apparent that the effective real relative dielectric constant is therefore corrupted by the imaginary parts of the relative dielectric constants of the two regions and likewise the effective conductivity is corrupted by the real parts of the relative dielectric constants. The model is now further related to actual earth formations. The first region is equated to connate water filling the pore space of the rock matrix with the water fractional volume being $\phi$ of the total formation volume. The second region is equated to the rock matrix with the rock matrix fractional volume being $(1-\phi)$ of the total formation volume. Expanding equation (6) to illustrate real and imaginary components and designating terms with respect to the above formation model yields $$\epsilon_{eff} + i\sigma_{eff}/\omega = \phi^2\epsilon_w + 2\phi(1-\phi)\sqrt{\epsilon_w + i\sigma_w/\omega)\epsilon_m} \; + (1-\phi^2)\epsilon_m \qquad (7)$$

where the subscripts w and m designate parameters associated with the water and rock components of the formation, respectively. Note that $\sigma_m$ is equal to zero. If measurements are made at two known frequencies $\omega=\omega_1,\omega_2$, equation (7) yields two independent complex equations. Because both real and imaginary parts of these equations must be equal, measurements at two frequencies actually yield four independent equations. The dielectric constant of water, $\epsilon_w$, is independent of the salinity of the water thus is a known quantity. The two frequencies are predetermined thus are known. The quantities $\epsilon_{eff}$ and $\sigma_{eff}$ are measured. The four independent equations can, therefore, be used to solve for the remaining three unknown quantities, namely the porosity $\phi$, the conductivity of the water $\sigma_w$, and the dielectric constant of the rock $\epsilon_m$. It is noted that a plurality of transmitter-receiver-operating frequency combinations can be used in embodiments of the invention as long as the chosen combination yields four independent equations relating $\sigma_{eff}$ and $\epsilon_{eff}$ to $\sigma_w$, $\epsilon_m$ and $\phi$. It should also be noted that the dielectric constant of the rock matrix and the dielectric constant of any hydrocarbon contained within the pore space of the rock are essentially equal and the conductivity of each is essentially zero. The computed quantity $\phi$ is therefore the fraction of water within the formation and not necessarily the effective porosity of the formation in the sense commonly used in the art. In order to obtain effective formation porosity, it is necessary to combine the "water filled" porosity yielded by the present invention with a second, independent, measure of formation porosity which responds to the total fluid filled porosity. An example of such a second measurement would be a thermal neutron "porosity" measurement which responds to the hydrogen content of the formation. Since most hydrogen in earth formation resides in the pore space rather than the rock matrix and since the response is essentially the same for both water and liquid hydrocarbons, the neutron porosity measurement yields total liquid porosity.

The invention is directed toward, but not limited to, MWD applications. The downhole apparatus comprises a drill collar, at least one transmitter and at least one receiver. The transmitter comprises a coil of one or more windings about the outside of the drill collar. The receiver likewise comprises a coil of one or more windings about the outside diameter of the drill collar and spaced longitudinally from the transmitter. It is a common practice to use a multiplicity of transmitters and receivers, all of which are longitudinally spaced along the drill collar and electrically insulated from the metallic drill collar. Multiple transmitters and receivers are employed for a number of reasons which include the minimization of borehole and near borehole effects and the measure of amplitude and phase at different radial positions with respect to the center of the borehole or, using terminology common in the art, to measure response at differing "depths of investigation." These applications will be discussed briefly. For purposes of disclosing the current invention, discussion will be focused upon one transmitter operating at two frequencies and one receiver pair which measures amplitude ratio and phase difference signals induced by the transmitter at each of the two frequencies.

BRIEF DESCRIPTION OF THE DRAWINGS

So that the manner in which the above cited features, advantages and objects of the present invention are attained and can be understood in detail, a more particular description of the invention, briefly summarized above, may be had by reference to the embodiments thereof which are illustrated in the appended drawings. It is noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
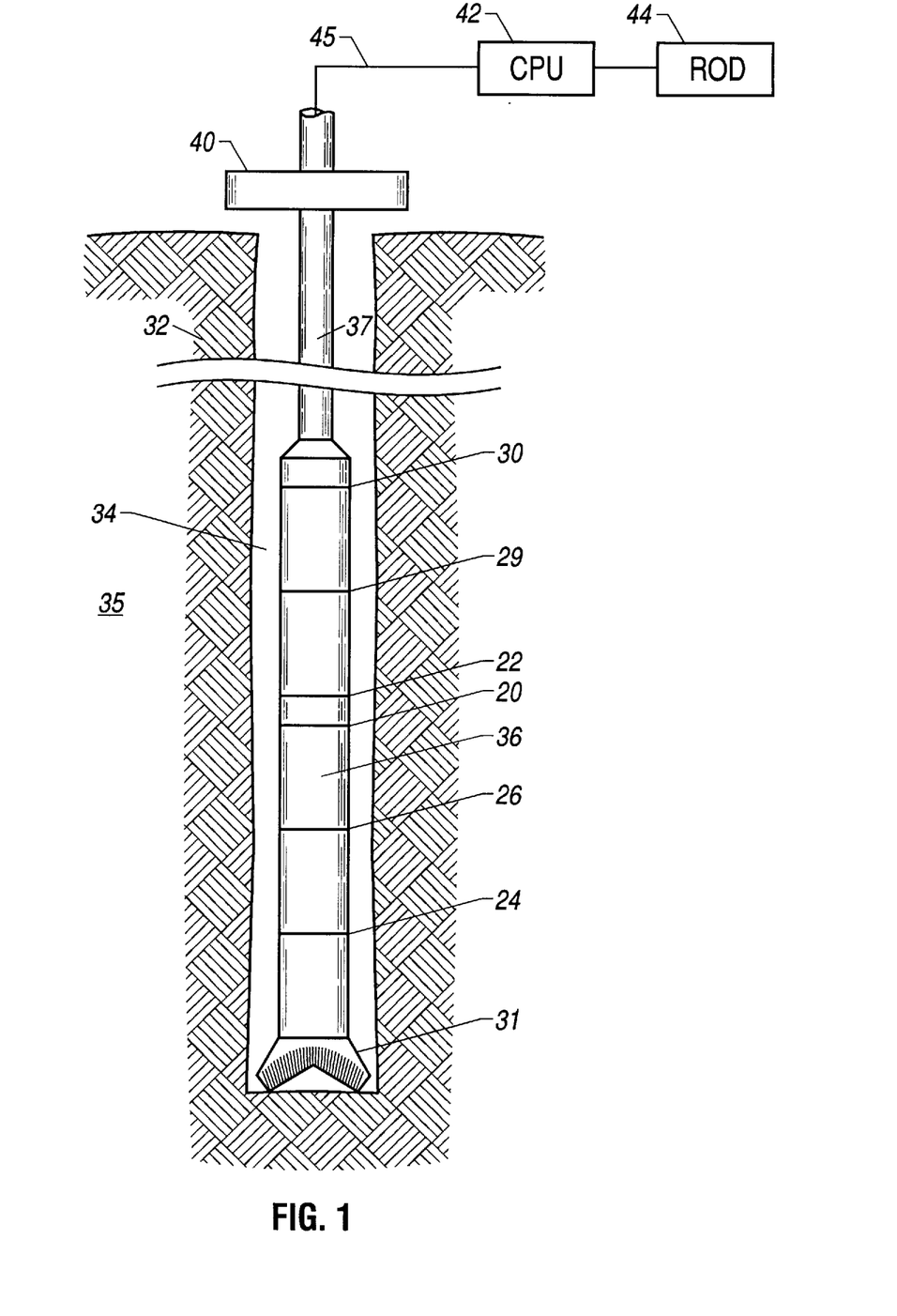
FIG. 1 illustrates the invention in a measurement-while-drilling (MWD) embodiment.

The invention employed in a MWD environment is illustrated in a very general manner in FIG. 1. The drill bit 31 is attached to the metallic drill collar 36 which, in turn, is mounted on the wellbore drill string 37. This assembly is shown suspended in a wellbore 34 which penetrates the earth formation 32. A means for rotating the drill string 37 is identified by the numeral 40. Four transmitter coils of one or more turns are identified by the numerals 26, 24, 29, and 30. The axes of the coils are coincident with the axis of the drill collar 36. The coils are electrically insulated from and slightly recessed within the outer diameter of the drill collar thereby comprising integral elements of the collar assembly. Two receiver coils are identified by the numerals 20 and 22. The geometries of these coils are quite similar to the geometries of the transmitter coils and again comprise integral elements of the collar assembly 36. Transmitter coils are arranged symmetrically on either side of the midpoint between receiver coils 20 and 22. Power sources and control circuitry for the transmitters and receivers are not shown. Data recorded by the receivers can be either transmitted in real time to the surface using drilling fluid pulsing means (not shown) or alternately can be recorded with recording means downhole (not shown) for later retrieval. For the real time data transmission embodiment, signals from the receivers are transmitted to the surface by a path means generically denoted by the numeral 46, transferred to a CPU for processing and correlated with depths from a drill collar depth indicator (not shown), and output to recorder 44 which displays the computed parameters of interest as a function of depth at which the input measurements were made. An alternate embodiment comprises a processor unit (not shown) mounted within the drill collar 36 to perform data processing downhole. Memory capacity is usually limited in MWD borehole instruments. In order to most effectively utilize memory capacity, it is often desirable to process measured data downhole and store processed results rather than the more voluminous measured data.

Figure 2:
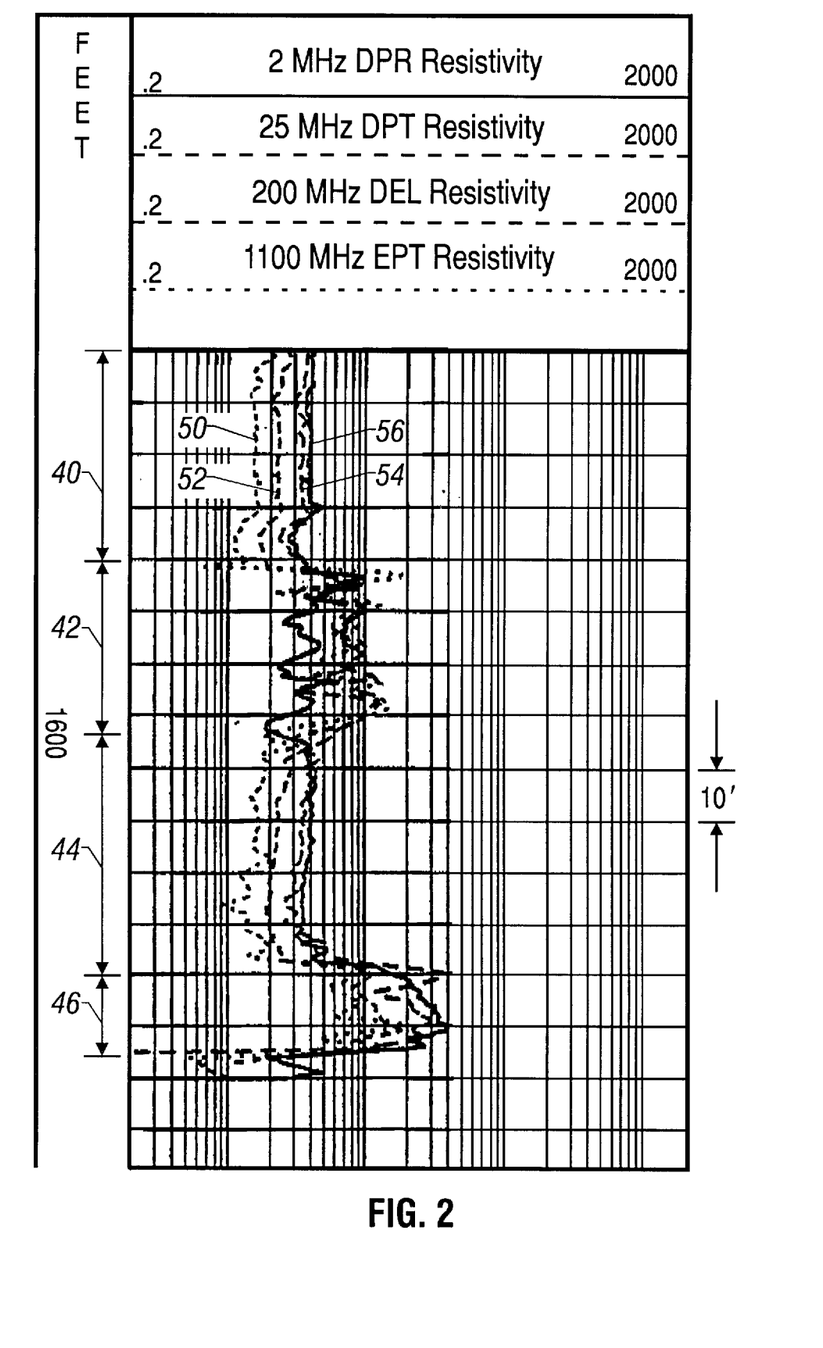
FIG. 2 shows apparent resistivity measured at four different transmitter frequencies and recorded as a function of depth within a well borehole.
Figure 3:
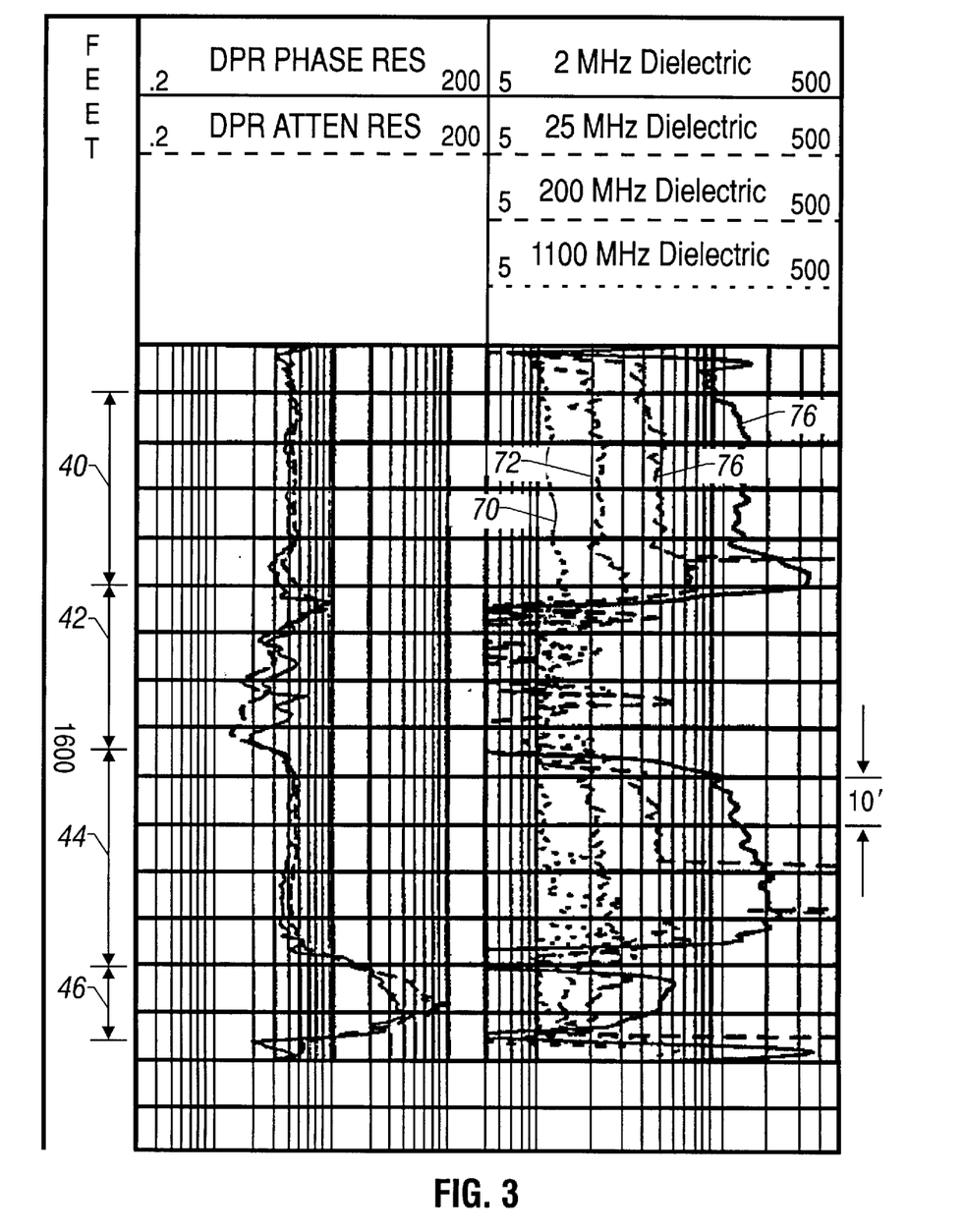
FIG. 3 shows apparent dielectric constant determined at four transmitter frequencies and recorded as a function of depth within a well borehole.
Figure 4:
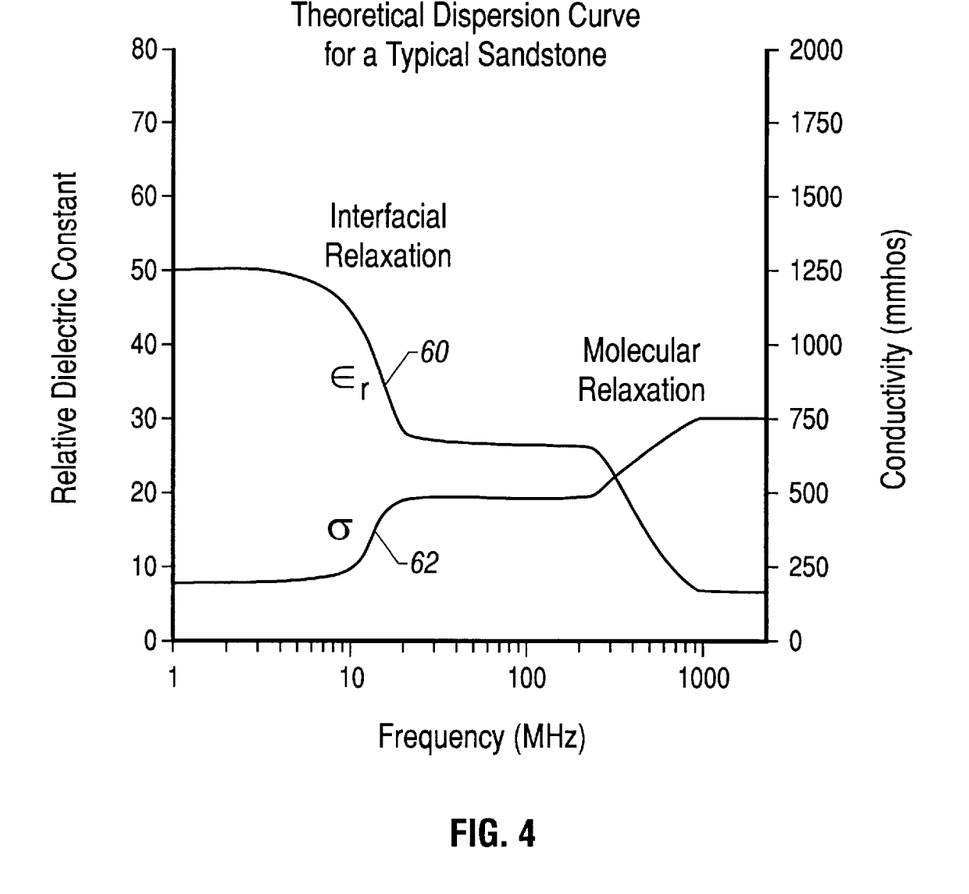
FIG. 4 illustrates the variation of measured relative dielectric constant and conductivity as a function of transmitter frequency.
Figure 5:
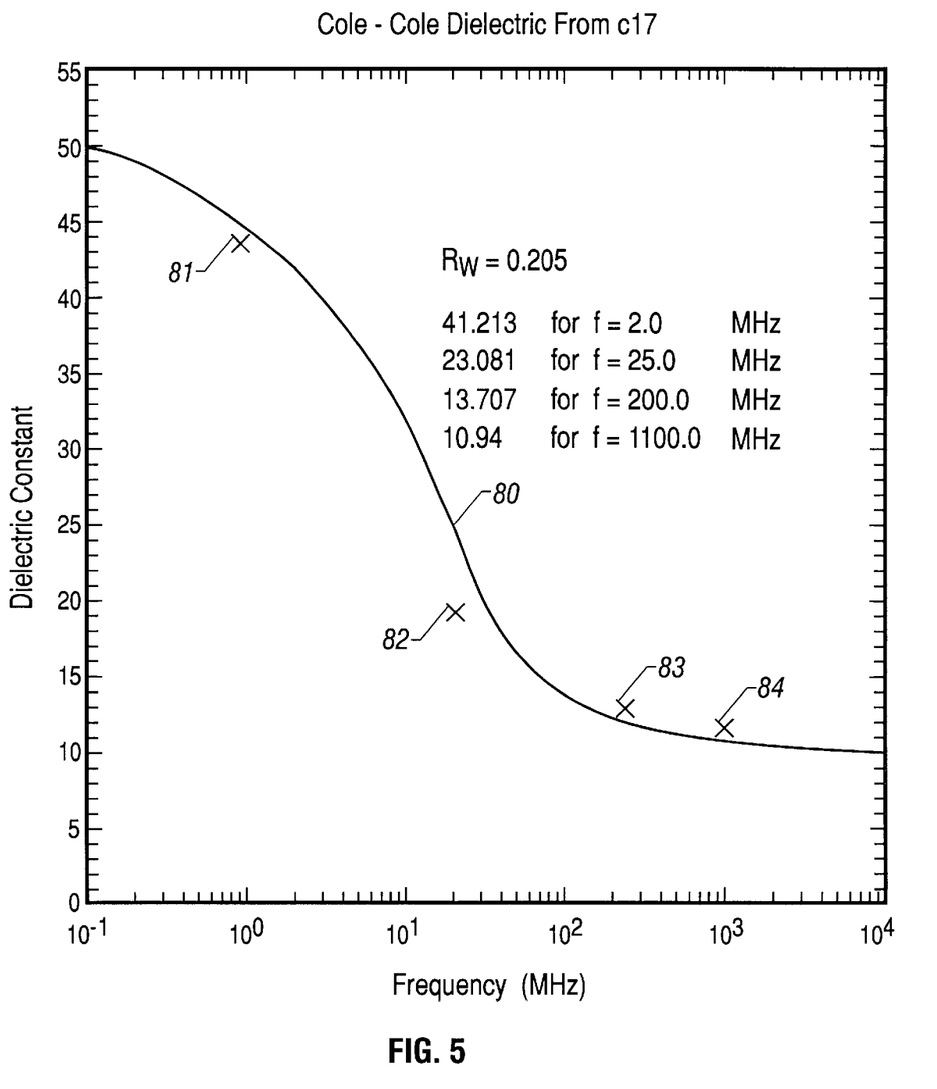
FIG. 5 depicts a plot of computed variation in dielectric constant as a function of transmitter frequency and a comparison of theoretical values with measured values at four different transmitter frequencies.

FIG. 2 illustrates resistivity, which is the inverse of conductivity, measured at four different transmitter frequencies as a function of depth, in feet, within a borehole. The measurements were made in a test well in which the characteristics of the formations are well known from numerous studies of well log and core data as referenced in "Comparison of MWD, Wireline and Core Data from a Borehole Test Facility", Paper SPE 22735, *proceedings of the Society of Petroleum Engineers 66th Annual Conference and Exhibition*, pp 741–754, (1991). These "logs" of resistivity clearly illustrate the effects of dispersion effects as a function of the frequency of the induced electromagnetic field. Attention will be focused on the zones denoted by the numerals 40 and 44 which are shales and the low permeability limestone zone denoted by the numeral 46. Zone 42 is a permeable sandstone, and is therefore invaded by the drilling fluid. Radial invasion combined with differing depths of investigations for the measurements at different frequencies mask the dispersion effects. Zone 42 will therefore be ignored in this discussion. Curves 50, 52, 54 and 56 represent resistivities measured at frequencies of 1100 MHz, 200 MHz, 25 MHz and 2 MHz, respectively. Knowing that zones 40, 44, and 46 are radially homogeneous (that is, non-invaded by the drilling fluid), it is concluded that the observed dispersion is due to dielectric effects. FIG. 3 illustrates relative dielectric constant measurement over the same formation zones of interest but at different frequencies where curves 70, 72, 74 and 76 represent measurements at 1100 MHz, 200 MHz, 25 MHz, and 2 MHz, respectively. Dielectric dispersion is again quite apparent. The phenomena of both dielectric and conductivity (or resistivity) dispersion and their dependency upon the frequency of the induced field has been discussed in a qualitative or conceptual sense in a previous section. The phenomena can be quantified as illustrated in FIG. 4 which illustrates generalized theoretical dispersion plots for a clean sandstone formation. The dielectric dispersion curve 60 illustrates that in general $\epsilon_r$ decreases as frequency increases. Conversely, the conduction curve 62 illustrates that conductive dispersion increases with increasing frequency. Both curves 60 and 62 also clearly illustrate frequency ranges at which interfacial relaxation and molecular relaxation occur. To assess whether the variations in the relative dielectric constant $\epsilon_r$ observed in the logs of FIG. 3 are indeed consistent with dispersion effects, the four values of $\epsilon_r$ depicted by curves 70, 72, 74 and 76 at a depth of 1660 feet in the limestone formation 46 were compared in FIG. 5 to a dispersion curve 80 based upon published (M. R. Taherain et al, "Dielectric Response of Water-Saturated Rocks", *Geophysics*, Vol. 55, No. 12, December 1990) dielectric measurements made on limestone core samples with matrix and connate water resistivities very similar to the limestone of formation 46. The superimposed data points 81, 82, 83, and 84 are average readings of the curves 76, 74, 72, and 70 taken at a depth of 1660 feet in zone 46, respectively. The good agreement between the core-derived dispersion curve and the log derived measurements from these two carbonate formations suggest that the differences between the various $\epsilon_r$ values from the log are indeed due to dispersion. Considering FIGS. 2, 3, 4 and 5 in combination, it is apparent that any model which simultaneously extracts dispersion corrected resistivity and dielectric constant values from measurements of phase difference and amplitude ratio at varying frequencies must quantitatively include the frequency of the induced electromagnetic field.

Recall that one of the basic objectives of the invention are to determine conductivity (or resistivity) of the formation which is free of dispersion effects. A second objective is to determine the dielectric constant of the formation which, again, is free of dispersion effects. A third objective is to determine effective water filled porosity of the formation which, when combined with independent measurements of total liquid filled porosity, can be used to determine the hydrocarbon saturation of the formation. A theoretical Complex Refractive Index Model (CRIM) has been developed which relates $\epsilon_r$ to true formation resistivity and meets the previously stated objectives of the invention. The development of the model begins with the solutions to Maxwell's equations in homogeneous lossy media are a function of a factor commonly referred to as the propagation constant or wave number, defined herein as "k", which contains conductivity, dielectric constant and magnetic permeability terms. A plane wave solution will have the form $$V = C e^{ikx} \tag{8}$$

where $V$ = a field variable;
$C$ = a constant
$e$ = the naperian log base
$i$ = the square root of 1;
$x$ = the distance traveled; and $$k = [(\omega^2 \mu_o \mu_r \epsilon_o \epsilon_r) + (\omega \mu_o \mu_r \sigma)]^{1/2} \tag{9}$$

where:

$c$ = the speed of light = $2.999 \times 10^8$ (meters/second);
$\mu_o$ = the magnetic permeability of free space = $4 \times 10^{-7}$;
$\mu_r$ = the relative permeability (which is 1.0 for free space and most earth materials);
$\epsilon_o$ = the electric permittivity of free space = $(1/\mu_o C^2)$ = $8.854 \times 10^{-12}$;

$\epsilon_r$=the relative dielectric constant (which is 1.0 in free space);

$\omega$=the angular frequency of the applied field; and $\sigma$=the conductivity.

The term k can be rewritten in terms of a relative complex dielectric constant, which includes the effect of dielectric constant and conductivity, as $$k = k_o \sqrt{\epsilon_c \mu_r} \qquad (10)$$

where $k_o$=the wave number in free space;

$\mu_r$=1; and the relative complex dielectric constant is $$\epsilon_c = [\epsilon_r + i\sigma(1/\omega\epsilon_o)]$$

Note that k is defined such that when the conductivity $\sigma$ goes to zero, the complex relative dielectric constant goes to the relative dielectric constant equals the real relative dielectric constant $\epsilon_r$.

We now assume a model of the earth formation wherein there are two layers of different propagation constants k and differing complex relative dielectric constants $\epsilon_c$ with the first region spanning $(1-\phi)$ units of length and the second region spanning $\phi$ units of length. A plane wave incident on the layers and passing through the layers without reflection will have the form $$e^{ik_2\phi} e^{ik_1(1-\phi)} = e^{i[k_2\phi + k_1(1-\phi)]} \qquad (11)$$

where the subscripts 1 and 2 denote parameters associated with layers 1 and 2, respectively. The effective propagation constant for this model, $k_{eff}$, is therefore $$k_{eff} = k_2\phi + k_1(1-\phi) \qquad (12)$$

or on terms of the complex dielectric constant defined above $$k_{eff} = k_o \sqrt{\epsilon_{eff}} = k_o [\sqrt{\epsilon_{c,2}}\ \phi + \sqrt{\epsilon_{c,1}}\ (1-\phi)] \qquad (13)$$

Equation (13) is solved for the equivalent relative dielectric constant to obtain $$\epsilon_{eff} = \epsilon_{c,2}\phi^2 + \epsilon_{c,1}(1-\phi)^2 + 2(1-\phi)\phi \sqrt{\epsilon_{c,1}\epsilon_{c,2}} \qquad (14)$$

The model is now further related to actual earth formations. The first region is equated to connate water filling the pore space of the rock matrix with the water fractional volume being $\phi$ of the total formation volume. The second region is equated to the rock matrix with the rock matrix fractional volume being $(1-\phi)$ of the total formation volume. Expanding equation (14) to illustrate real and imaginary components and designating terms with respect to the above formation model yields $$\epsilon_{eff} + i\sigma_{eff}/\omega = \phi^2\epsilon_w + 2\phi(1-\phi)\sqrt{(\epsilon_w + i\sigma_w/\epsilon_m)}\ + (1-\phi^2)\epsilon_m \qquad (15)$$

where the subscripts w and m identify parameters associated with the water and rock matrix components, respectively. Note that $\sigma_m$ is equal to zero.

The effective real dielectric constant is therefore corrupted by the imaginary part of the dielectric constants of the two regions, and likewise the effective conductivity is corrupted by the real parts of the relative dielectric constants. That is $$\epsilon_{r,eff} = Re(\epsilon_{c,eff});\ \text{and}\ \sigma_{eff} = \omega\epsilon_o Im(\epsilon_{r,eff} Im) \qquad (16)$$

In order to calculate the dielectric constants that we would expect to observe in clean water saturated rocks, it will be assumed that the rocks are composed of two parts which comprise the rock matrix and the connate water. The resistivity of the water and the porosity of the rock matrix are varied within reasonable limits and the dielectric constant of the combination of the two parts, which is the quantity actually sensed by the borehole instrument, is calculated utilizing the two component mixing relationship derived above. The subscripts w and m designate parameters associated with the water and rock parts, respectively.

Figure 6A:
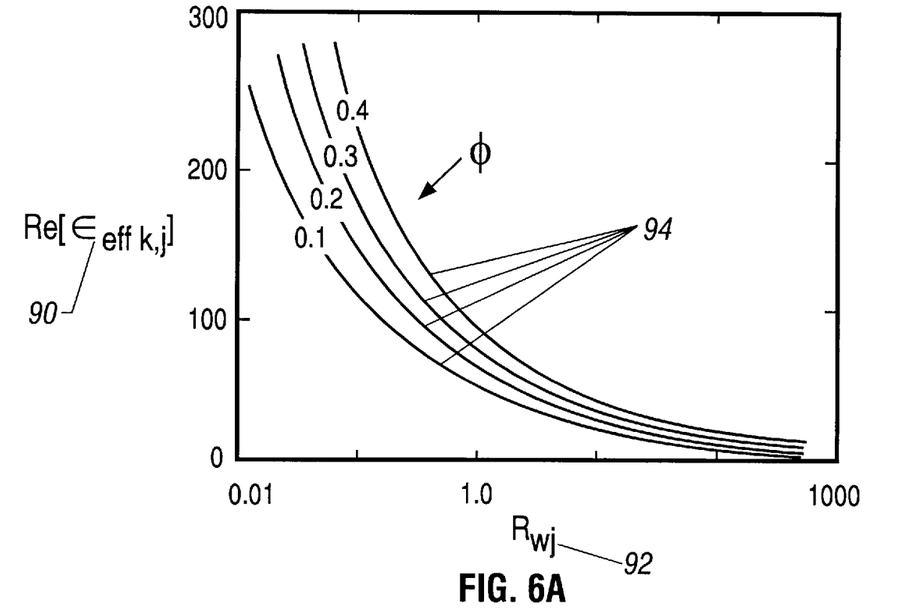
FIGS. 6a and 6b illustrate the variation of the real portion of effective dielectric constant and the real portion of effective formation conductivity as a function of water resistivity, respectively, at various formation porosities.
Figure 6B:
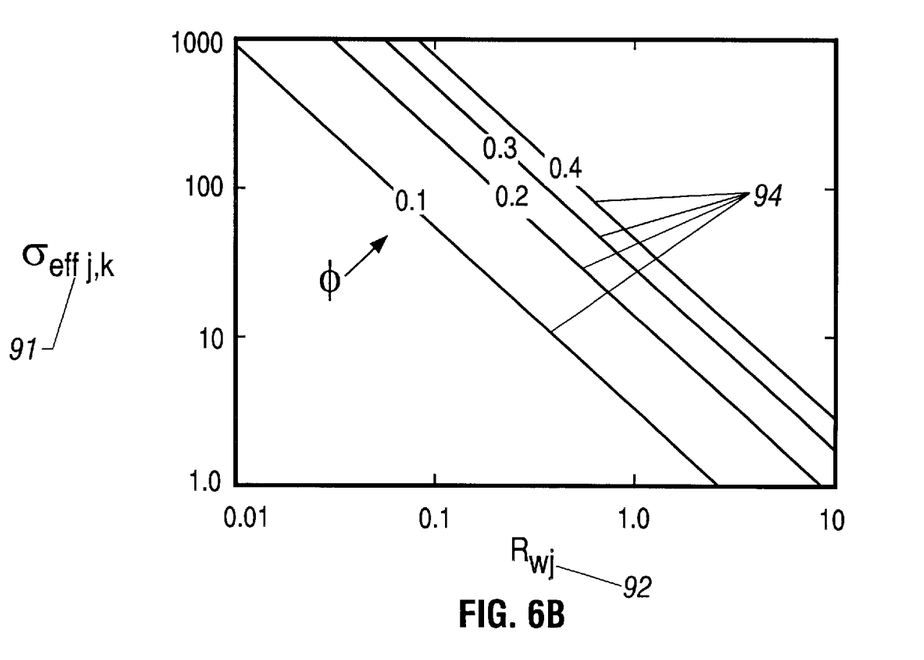

The relationship of equation (15) can be used to graphically illustrate the functional relationships between the measured quantities and the parameters which are of interest and which are to be determined. FIGS. 6a and 6b are presented as typical illustrations of these relationships. The real part 90 of the effective dielectric constant as defined by equation (15) is plotted in FIG. 6a as a function of the formation water resistivity, denoted on the abscissa as 92, for various porosities 94. The abscissa is logarithmic and the ordinate is linear. These plots are for a frequency $\omega_1$=2 MHz. The real part 91 of the formation effective conductivity is plotted in FIG. 6b as a function of formation water resistivity 92, again at $\omega_1$=2 MHz and again for varying porosities 94. Both the ordinate and the abscissa are logarithmic. Similar plots can be generated for the real and imaginary components of and $\sigma_{eff}$ at $\omega_1$=2 MHz and likewise plots for both the real and imaginary parts of $\sigma_{eff}$ and at a second frequency $\omega_2$=400 KHz. These are graphical depictions of a set of four independent equations used to determine the 'unknown" formation parameters of interest, namely the effective conductivity (or resistivity), the effective dielectric constant and the water filled porosity of the formation.

DETERMINATION OF DIELECTRIC CONSTANT RESISTIVITY AND POROSITY

Attention is again directed to FIGS. 2 and 3 which show resistivity and dielectric data, respectively. FIG. 2 depicts data from four downhole systems, with the 2 MHz data being measured with a MWD system and the remaining being measured with wireline systems. FIG. 3 depicts dielectric data measured with the same systems. Dispersion of the measurements as a function of frequency is clearly exhibited in both logs. Based upon the previously discussed principles, the dispersion in the resistivity measurements would be expected to be small at 2 MHz and lower frequencies. Attention is drawn in particular to zone 46 which is known from core data to be impermeable carbonate. Dispersion in this zone can only be attributed to dielectric effects. Zone 42 is a sandstone which is known to be permeable and therefore invaded with drilling fluids prior to running the wireline logs. The observed dispersion in this zone must be attributed to, at least in part, to invasion effects as well as dielectric effects. Data from zone 46 will, therefore, be used to illustrate the determination of dielectric dispersion of resistivity measurements. Attention is further drawn to FIG. 5 which illustrates observed dielectric data superimposed upon laboratory measurements of dielectric constant as a function of frequency published in the previously cited Taherain reference. The curve as illustrated was fitted using the model of Cole and Cole as previously referenced. At a depth of 1660 feet, dielectric constants measured at 2 MHz and 25 MHz are denoted by the numerals 41 and 21, respectively and the corresponding resistivities are denoted by the numerals 38 and 27, respectively. These values of $\epsilon_{eff}$ and $\sigma_{eff}=1/R_{eff}$ are inserted into equation (7) at the respective frequencies, real and imaginary parts of equation (7) are equated yielding a set of four equations, and a non-linear regression scheme such as a ridge regression is employed to solve for the resistivity of the water $R_w=1/\sigma_w=0.16$, the dielectric constant of the rock matrix $\epsilon_m=9.0$, and the formation porosity $\phi=0.05$ or 5%. These are reasonable values for impermeable carbonate and agree well with core data taken in zone 46.

The above description may make other alternative embodiments of the invention apparent to those skilled in the art. It is therefore the aim of the appended claims to cover all such changes and modifications as fall within the true spirit and scope of the invention.

What is claimed is:

1. A method for determining certain parameters of interest by utilizing an electromagnetic propagation device conveyed in a borehole in a formation, comprising:
   (a) inducing electromagnetic radiation in the formation at at least two frequencies;
   (b) obtaining a plurality of real and imaginary components of measurements from the electromagnetic device conveyed in the borehole, at said frequencies;
   (c) defining a plurality of parameters of interest to be determined, at least one such parameter of interest being selected from a group consisting of (i) water filled porosity of the formation, (ii) dielectric constant of a dry formation, and (iii) resistivity of a connate formation fluid;
   (d) defining a mixing model that relates the plurality of real and imaginary components of measurements to the parameters of interest to be determined; and
   (e) determining the value of the parameters of interest utilizing the plurality of real and imaginary components of measurements and the mixing model.

2. The method of claim 1, wherein the at least two frequencies include a 400 KHz frequency and a 2 MHz frequency.

3. The method of claim 1, wherein the mixing model is based on dielectric dispersion.

4. The method lf claim 3, wherein the mixing model is a CRIM model.

5. The method of claim 3 wherein said real and imaginary measurements of said induced electromagnetic radiation are recorded as a function of depth within the borehole at which they are measured.

6. The method of claim 5 wherein said values of the resistivity of said connate formation fluid, the dielectric constant of said dry formation, and said water filled porosity of the formation are recorded as a function of depth within the borehole at which said amplitude and phase measurements from which they are computed are measured.

7. The method of claim 6, wherein said borehole instrument is conveyed along the borehole with a drill string.

8. The method of claim 6 wherein said borehole instrument is conveyed along the borehole with a wireline.

9. A method of determining certain parameters of interest by utilizing an electromagnetic propagation device conveyed in a borehole, comprising:
   (a) inducing electromagnetic radiation in the formation;
   (b) obtaining at least two real and imaginary components of measurements at a first frequency and a second frequency from the electromagnetic device conveyed in the borehole;
   (c) defining a plurality of parameters of interest to be determined, at least one such parameter of interest being selected from a group consisting of (i) water filled porosity of the formation, (ii) dielectric constant of a dry formation, and (iii) resistivity of a connate formation fluid;
   (d) defining a mixing model that relates the real and imaginary components of measurements to the parameters of interest to be determined; and
   (e) determining the value of the parameters of interest by utilizing the plurality of real and imaginary components of measurements and the mixing model.

10. The method of claim 9, wherein the at least two frequencies include a 400 KHz frequency and a 2 MHz frequency.

11. The method of claim 9, wherein the mixing model is based on dielectric dispersion.

12. The method lf claim 11, wherein the mixing model is a CRIM model.

13. The method of claim 11 wherein said real and imaginary measurements of said induced electromagnetic radiation are recorded as a function of depth within the borehole at which they are measured.

14. The method of claim 13 wherein said values of the resistivity of said connate formation fluid, the dielectric constant of said dry formation, and said water filled porosity of the formation are recorded as a function of depth within the borehole at which said amplitude and phase measurements from which they are computed are measured.

15. The method of claim 14, wherein said borehole instrument is conveyed along the borehole with a drill string.

16. The method of claim 6 wherein said borehole instrument is conveyed along the borehole with a wireline.

17. An apparatus, conveyed in a borehole in a formation, for determining certain parameters of interest, at least one such parameter of interest being selected from a group consisting of water filled porosity of the formation, dielectric constant of a dry formation, and resistivity of a connate formation fluid; at least the water filled porosity of the formation, comprising:
   (a) a transmitter for inducing electromagnetic radiation in the formation at at least two frequencies;
   (b) a receiver for measuring the real and imaginary parts of the induced electromagnetic radiation in the formation at each of said frequencies;
   (c) a mixing module that relates the parameters of interest to said plurality of real and imaginary parts of the induced electromagnetic radiation;
   (d) a CPU for processing data measured by said receivers using the mixing module wherein the resulting processed data comprises measures of the parameters of interest;
   (e) a data transfer system for transferring the measurements made by the receivers to the CPU;
   (f) a depth measuring system for tracking the depth of said borehole instrument within said borehole; and
   (g) a recorder for recording said processed data as a function of depth within said borehole at which said measured data used to generate said processed data is measured.

18. The apparatus of claim 17 wherein said apparatus is conveyed by a drill string.

19. The apparatus of claim 17 wherein said data transfer system comprises a mud pulse system with said CPU located at the surface of the earth.

20. The apparatus of claim 17 wherein said data transfer comprises a downhole recorder for recording and storing the measured data in the borehole instrument, and wherein said data transfer system further comprises one or more electrical conductors connecting said downhole recorder to the CPU when the borehole instrument is retrieved at the surface of the earth.

21. The apparatus of claim 17 wherein said apparatus is conveyed by a wireline.

22. The apparatus of claim 21 wherein said data transfer system for transferring of measured data to the CPU comprises one or more electrical conductors contained within the wireline.

* * * * *